July 4, 1961 J. E. KELLY 2,990,939
CONVEYOR
Filed April 7, 1959

INVENTOR.
JOHN E. KELLY
BY
Robinson + Berry
ATTORNEYS

United States Patent Office 2,990,939
Patented July 4, 1961

2,990,939
CONVEYOR
John E. Kelly, Hoquiam, Wash., assignor to Lamb-Grays Harbor Co., Inc., Hoquiam, Wash., a Washington company
Filed Apr. 7, 1959, Ser. No. 804,724
4 Claims. (Cl. 198—108)

This invention relates to "air conveyors" of the general character of those described and illustrated in United States Patents No. 2,315,627 and No. 2,785,928 wherein disclosure is made of the use of flat topped tables upon and along which large heavy stacks of paper or pulp sheets may be moved; the table tops being equipped with orifices through which air under pressure is admitted to the under surfaces of the stacks thus to facilitate their movement or conveyance.

In the above numbered United States patents it is further disclosed that the air discharge orifices in the table top are equipped with normally closed valves designed to be opened by a stack in its passing thereover thus to permit outflow of supporting air to the under surface of the stack. When the stack moves from contact with any valve, the valve automatically closes.

In the present invention, the use of a conveyor belt that is supported upon and for travel on the table top for the conveyance of the stacks thereon is employed and provision has been made for admittance of air under pressure between the table top and belt to facilitate the belt moving operation.

The conveyance of paper stacks, and the like, on continuous belts that bear flatly upon and are drawn across flat supporting surfaces has heretofore been practised. Also, the moving of stacks of paper and pulp on belts that are supported by closely spaced rollers has heretofore been practised. However, in neither of these operations has the practise been entirely satisfactory. First, it must be recognized that to drag a flat belt, on which a heavy load is supported, across a flat supporting surface requires excessive mechanical power. Furthermore, the belt dragging operation results in excessive wear on the belt. In the case where a conveyor belt is supported on rollers, the frictional wear on the belt may be materially lessened and the power required for operation greatly reduced, but there is still that very undesirable incident result of the creeping of the bottom sheets of the stack by reason of the constant wave-like flexing action imparted to the belt as it is drawn across the supporting rollers.

The present invention has provided for the combining of the various advantages that accrue from use of a conveyor belt including the fast, easy and convenient conveyance of stacks with the advantages that are gained by the use of air under pressure, as set out in the patents previously mentioned, to float the load for easy travel across the belt supporting surface.

It is the principal object of the present invention to provide improvements in the use of conveyor belts for the moving of heavy loads across flat topped supports without waste of compressed air; the improvement being characterized by the novel means for and mode of application of air under pressure to the underside of the belt to maintain a film of air on which the belt floats.

It is a further object of the invention to provide a conveyor system in which the air, that provides the belt and load supporting film is admitted through vortex orifices that are arranged in the table top, only along the center line of the belt.

It is a further object of this invention to provide vortex orifices for supplying the belt and load supporting air film in conjunction with slow leaking air passages in the table top through which air is admitted to the under side of the belt as the means for cracking it loose from the table top at the start of a conveying operation.

Further objects and advantages of the invention reside in the novel arrangement and details of construction and combination of parts, and in the mode of use and operation of the invention, as will hereinafter be fully described.

In accomplishing these above mentioned and other objects of the invention, I have provided the improved details of construction, the preferred forms of which are illustrated in the accompanying drawings wherein.

It will be here mentioned that the main difference between the present conveyor and those of the patents previously mentioned resides, first, in the fact that, in the patents, the air orifices are located in close spacing over the entire area of the table top and second, are valved, thus providing that air under pressure be admitted to the under surface of the stacks through these orifices only when the valves are engaged by the stacks and thereby opened. Whereas, in the present instance, there is a single row of unvalved vortex orifices along the center line of the table top, and a single row of slow-leak passages along each of the opposite sides of the center row of vortex orifices, thus providing for a great saving of compressed air for the operation.

Before giving a detailed description of the present combination of parts, it will be mentioned, as explanatory matter, that once the compressed air is turned off and a loaded conveyor belt of the character herein shown comes to rest on a flat table top, it becomes extremely difficult to crack the belt loose from the table surface, particularly if the table top is equipped with only a central row of air discharge orifices. This is due to the fact that the belt, if loaded, will be pressed so tightly against the table over the orifices that when the air is turned on, the static pressure of the air, and the small area of the belt against which it acts, prevents the belt being lifted sufficient for the vortex action to be set up. It is for this reason that the present slow leaking passages have been provided to admit air in very limited quantity to the under side of the belt, but in sufficient amount to build up or maintain an air film that is sufficient to prevent the tight sealing of the belt to the table top surface and over the vortex orifices.

Figure 1:
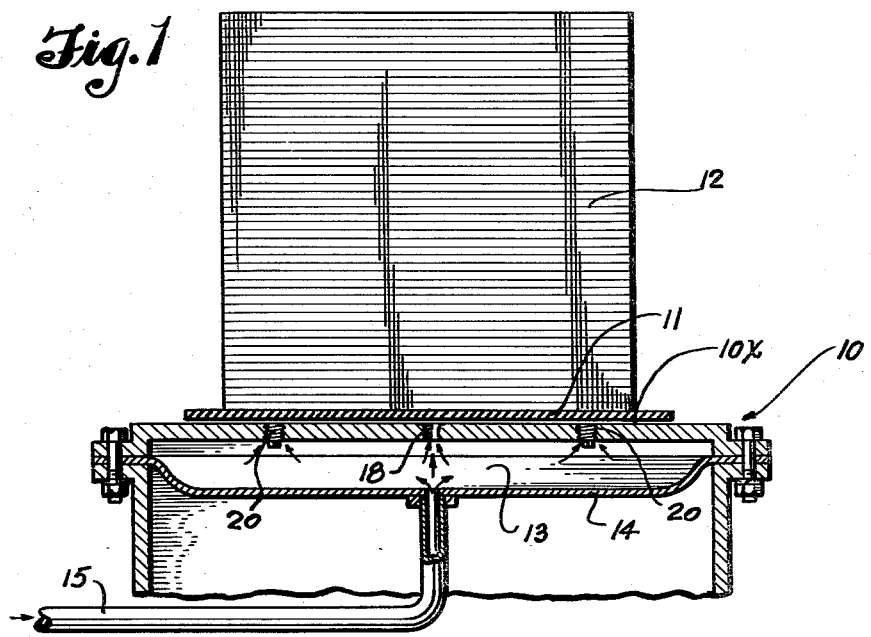
FIG. 1 is a vertical cross-section of a conveyor table as equipped with an air chamber beneath its top and across which top a conveyor belt is movable on a film of air in accordance with the teaching of the present invention.

FIG. 1 shows, in cross-section, a typical conveyor table 10 having a horizontal, flat surfaced top 10x. This may be of any width that is best suited for its present use and likewise it may be of any required or desired length. A flat, flexible conveyor belt 11 is supported on and extends lengthwise of the table top for the conveyance thereon of stacks of pulp or paper sheets; such a stack being designated in FIG. 1 by numeral 12. This conveyor belt may be continuous, and operable about the supporting wheels or about guides and driven by any suitable power means, not herein shown. Immediately below the table top 10x is an air tight chamber 13 defined between the table top and a bottom plate 14; this chamber being supplied with air under pressure, delivered through a pipe or conduit such as that designated by numeral 15.

The conveyor belt 11 has a transverse width substantially equal to that of the table top 10x and the stack 12 is here shown to be of somewhat lesser width. When the air is turned off and the belt is idle, it rests flatly on the table top surface, but with the admittance of air under pressure to its underside as presently explained, it will be supported thereby for easy travel.

To provide for the admittance of air to the underside of the belt from chamber 13 to float the belt and its load, the table top is formed, preferably, along its central longitudinal line, with a succession of orifices 18. Ordinarily these orifices would be approximately 1/8 inch in diameter and spaced about six inches apart. Preferably they are bored and therefore are of circular cross-section. Their bounding surfaces are outwardly rounded at their upper ends, as shown at 19 in FIG. 2, to merge tangentially into the top surface of the table, thus to permit a vortex action of the air as discharged therethrough to the underside of the belt 11. The holes 18 may be bored in the table top, as seen in FIG. 1, or bored in plugs as designated by reference numeral 20x in FIG. 2; which are then tightly threaded into holes provided therefor in the table top.

It is also shown in FIG. 1 that the table top is equipped at distances outwardly spaced from the central row of vortex orifices 18 with a succession of slow leaking plugs 20; these plugs being located in rows that are set in holes formed in the table top within the longitudinal edge limits of the belt and also within the side edge limits of the stack as shown in FIG. 1. Such plugs may be spaced at suitable distances, generally about six inches apart.

Figure 4:
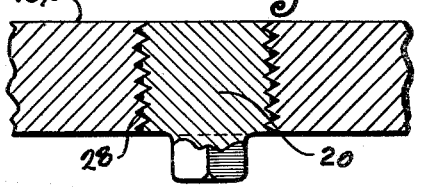
FIG. 4 is a vertical section taken centrally through one of the slow leak producing plugs as used in the table top.
Figure 5:
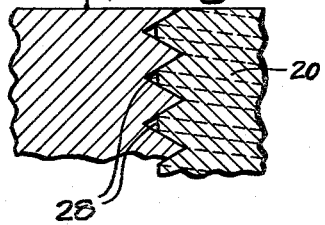
FIG. 5 is an enlarged sectional detail of a part of the leak producing plug.

The preferred way of forming these slow-leak passages is to provide the table top with the two rows of threaded openings and to apply the threaded plugs 20 to these openings, as has been shown in FIG. 4. The slow air leak is provided by removal of slight amounts of the outer periphery of the plug thread, as shown at 28 in FIG. 5, thus to provide a very small area air passage extending along the plug thread.

Figure 6:
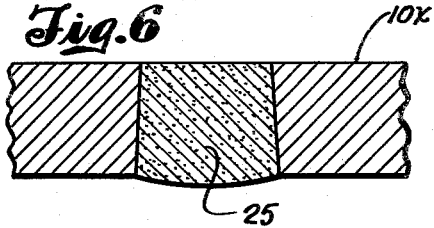
FIG. 6 is a cross-sectional view of a porous plug that may be used in lieu of the plug of FIG. 4.

Various other ways of permitting the escape of air from the chamber 13 to the under side of the belt might be employed, such as, for example, by the drilling of very small holes through the table top, or by inserting plugs of a porous material in holes bored or otherwise formed through the table top such as that plug shown at 25 in FIG. 6.

Assuming that the conveyor table and belt combination has been provided as shown in FIG. 1 and that a stack or stacks 12 of the character shown in FIG. 1 have beeen placed on the belt and it is desired to start the belt in operation, the procedure is as follows: air under pressure is admitted through pipe 15 to chamber 13. As the pressure builds up, certain amount of air will leak from the chamber through the passages provided by the plugs 20. Finally the air film between table top and belt will be sufficient and of such pressure as to crack the belt loose from the table surface. When this occurs, air will escape through the orifices 18 and set up the vortex action that will float the belt and its load. Then the belt can be easily started and drawn along the table top, practically free of frictional wear on belt or table.

When a conveying operation has been finished, the air as supplied through line 15 is cut off and the belt settles onto the table top. If loaded, as in FIG. 1, it will seal the orifices 18.

By provision of the present slow leak passages, whether formed by plugs of FIG. 4 or of FIG. 6 or otherwise, air can be admitted therethrough without excessive waste for cracking the belt free of the table surface so that the air discharged under pressure from orifices 18 will support it for easy travel. Once the belt is cracked loose, the vortex action of air from the orifices 18 becomes most effective and belt sustaining pressure is extending to the full width of the belt.

Figure 2:
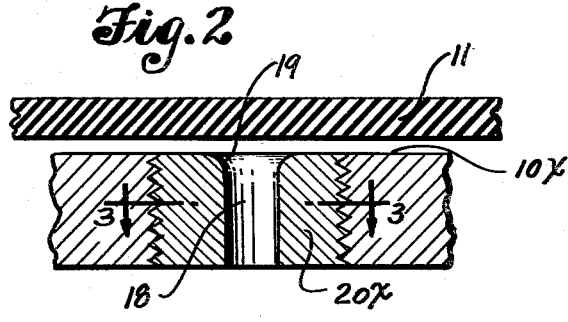
FIG. 2 is an enlarged cross-sectional view taken in a vertical plane through one of the vortex orifices as formed in the table top.
Figure 3:
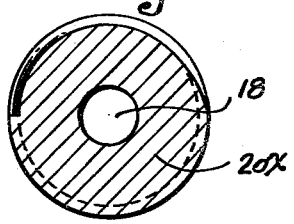
FIG. 3 is a horizontal section taken on the line 3—3 in FIG. 2.

The manner of forming the vortex openings may be either as shown in FIG. 1 wherein it is indicated that they are drilled through the table top whereas in FIG. 2 they are shown to be drilled through plugs 20x that are threaded into threaded openings provided therefor in the table top.

One of the principal advantages of the present invention resides in the use of a conveyor belt for moving the stacks along the table top in lieu of pushing them manually. A further advantage resides in maintaining a load supporting film of air between belt and table top; these advantages being made possible by the use of the present arrangement of slow-leak passages in conjunction with the central row of vortex orifices; the former functioning without waste of compressed air and the latter supplying the belt floating air film while the load is moving.

What I claim as new is:

1. A conveyor of the character described comprising a horizontal support with a flat top surface, a flat load-conveying belt supported on and adapted for travel above said surface, a plurality of spaced air discharge orifices of substantial size opening upwardly through said flat surface along the medial portion thereof, said flat surface having a plurality of air escape means opening upwardly through said flat surface and being laterally spaced from said orifices on opposite sides thereof and adjacent the side edges of said belt, said air escape means including air passages of substantially less size than said air discharge orifices whereby the amount of air escaping through said air escape means is substantially less than that escaping through said discharge orifices, and means for supplying air under pressure to said orifices and to said air escape means.

2. The device defined in claim 1, wherein said air escape means includes openings to which air under pressure is supplied, threaded plugs being threaded within said openings, said plugs having their threads so formed as to provide slow leaking passages therealong.

3. A conveyor as recited in claim 1, wherein said air escape means includes holes leading upwardly through said flat surface and to which holes air under pressure is supplied, said holes having plugs of porous material positioned therein.

4. A conveyor of the character described comprising a supporting table having a flat top surface, an air chamber formed beneath and along said top surface, a load conveying belt supported on and movable above said surface and means for supplying air under pressure to said chamber, said flat top surface having a row of orifices formed therein and opening upwardly therethrough from said chamber to the under side of and along the medial line of said belt, and rows of air escape means formed upwardly through said table at opposite sides of and outwardly spaced from the line of orifices and opening upwardly from said chamber to the under side of said belt, said air escape means including passages of substantially less size than said orifices whereby the amount of air escaping through said air escape means is substantially less than that escaping through said orifices.

References Cited in the file of this patent

UNITED STATES PATENTS

| | | |
|---|---|---|
| 756,600 | Dodge | Apr. 5, 1904 |
| 1,590,872 | Angevine | June 29, 1926 |
| 1,967,577 | Katz | July 24, 1934 |
| 2,315,627 | Lamb | Apr. 6, 1943 |